(12) United States Patent
Fukui

(10) Patent No.: US 9,591,184 B2
(45) Date of Patent: Mar. 7, 2017

(54) IMAGE PROCESSING SYSTEM, IMAGE PROCESSING APPARATUS, IMAGE PROCESSING METHOD, AND NON-TRANSITORY COMPUTER READABLE MEDIUM FOR BACKUP OUTPUT CONTROL

(71) Applicant: FUJI XEROX CO., LTD., Tokyo (JP)

(72) Inventor: Takeshi Fukui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/812,216

(22) Filed: Jul. 29, 2015

(65) Prior Publication Data

US 2016/0286088 A1 Sep. 29, 2016

(30) Foreign Application Priority Data

Mar. 24, 2015 (JP) .................................. 2015-061406

(51) Int. Cl.
*H04N 1/50* (2006.01)
*H04N 1/56* (2006.01)
*G06F 3/12* (2006.01)

(52) U.S. Cl.
CPC ............... *H04N 1/50* (2013.01); *G06F 3/124* (2013.01); *H04N 1/56* (2013.01)

(58) Field of Classification Search
None
See application file for complete search history.

(56) References Cited

U.S. PATENT DOCUMENTS

| | | | | |
|---|---|---|---|---|
| 8,498,000 B1* | 7/2013 | Komazawa | ........... | G06F 3/1215 358/1.13 |
| 2011/0252194 A1* | 10/2011 | Matsui | ................... | G06F 1/3221 711/114 |
| 2012/0057201 A1* | 3/2012 | Tsukamoto | ........... | G06F 3/1212 358/1.15 |

FOREIGN PATENT DOCUMENTS

JP 2009-6570 A 1/2009
JP 2013-200627 A 10/2013

\* cited by examiner

*Primary Examiner* — Christopher D. Wait
(74) *Attorney, Agent, or Firm* — Sughrue Mion, PLLC

(57) ABSTRACT

An image processing system includes image processors. Each image processor outputs image data of one of color components that the image processor is in charge of to an image forming unit. Each image processor includes an accumulator that accumulates transferred image data of the color components; a generator that processes rendering data, and, for a corresponding page, generates image data of the color components; a transfer controller that transfers the image data to the accumulator when the accumulator is normal and to another accumulator when the accumulator has a defect, and, when the accumulator is normal, further transfers to the other image processors the image data of color components whose output is taken charge of by the other image processors; and an output controller that outputs the accumulated image data and the transferred image data of the color component in an order of pages to the image forming unit.

12 Claims, 8 Drawing Sheets

| ID | PAGE NUMBER |
|---|---|
| ID001 | 1, 9, ... |
| ID002 | 2, 10, ... |
| ... | ... |
| ID008 | 8, 16, ... |

IMAGE PROCESSING SYSTEM, IMAGE PROCESSING APPARATUS, IMAGE PROCESSING METHOD, AND NON-TRANSITORY COMPUTER READABLE MEDIUM FOR BACKUP OUTPUT CONTROL

CROSS-REFERENCE TO RELATED APPLICATIONS

This application is based on and claims priority under 35 USC 119 from Japanese Patent Application No. 2015-061406 filed Mar. 24, 2015.

BACKGROUND (i) Technical Field

The present invention relates to an image processing system, an image processing apparatus, an image processing method, and a non-transitory computer readable medium.

(ii) Related Art

As the printing speed of a printer becomes fast, it becomes necessary to generate image data in a format handled by the printer (such as a raster format) and to transfer the image data to the printer such that the image data will make it in time for printing at this printing speed. In the case where generation of the image data is not ready in time, for example, intermittent printing occurs, such as some pages falling out or blank pages being inserted in a printing result obtained by the printer. In order to prevent the intermittent printing, it has been done to accumulate once image data generated by an image processing apparatus such as a print server in a large-capacity storage device such as a hard disk drive, and to read out the image data accumulated in the storage device in order to make it in time for printing by the printer.

SUMMARY

According to an aspect of the invention, there is provided an image processing system including multiple image processors. Each of the multiple image processors outputs, on the basis of rendering data in which processing of rendering an image for each of multiple pages is described, image data of one of multiple color components handled by an image forming unit that forms an image, the one color component being a color that the image processor is in charge of, to the image forming unit. Each of the multiple image processors includes an accumulator, a generator, a transfer controller, and an output controller. The accumulator accumulates transferred image data of the multiple color components. The generator processes the rendering data, and, for a page that is different among the multiple image processors, generates image data of the multiple color components. The transfer controller performs control to transfer the generated image data of the multiple color components to the accumulator of the local image processor in a case where the accumulator of the local image processor is normal, and to the accumulator of any one of the other image processors in a case where the accumulator of the local image processor has a defect, and, in a case where the accumulator of the local image processor is normal, further performs control to transfer the image data of color components whose output is taken charge of by the other image processors, from the accumulator of the local image processor to the other image processors, respectively. The output controller performs control to output the image data of the one color component accumulated in the accumulator of the local image processor, and the image data of the one color component transferred from the other image processors, in an order of pages to the image forming unit.

BRIEF DESCRIPTION OF THE DRAWINGS

An exemplary embodiment of the present invention will be described in detail based on the following figures, wherein.

DETAILED DESCRIPTION

Figures 1, 2:
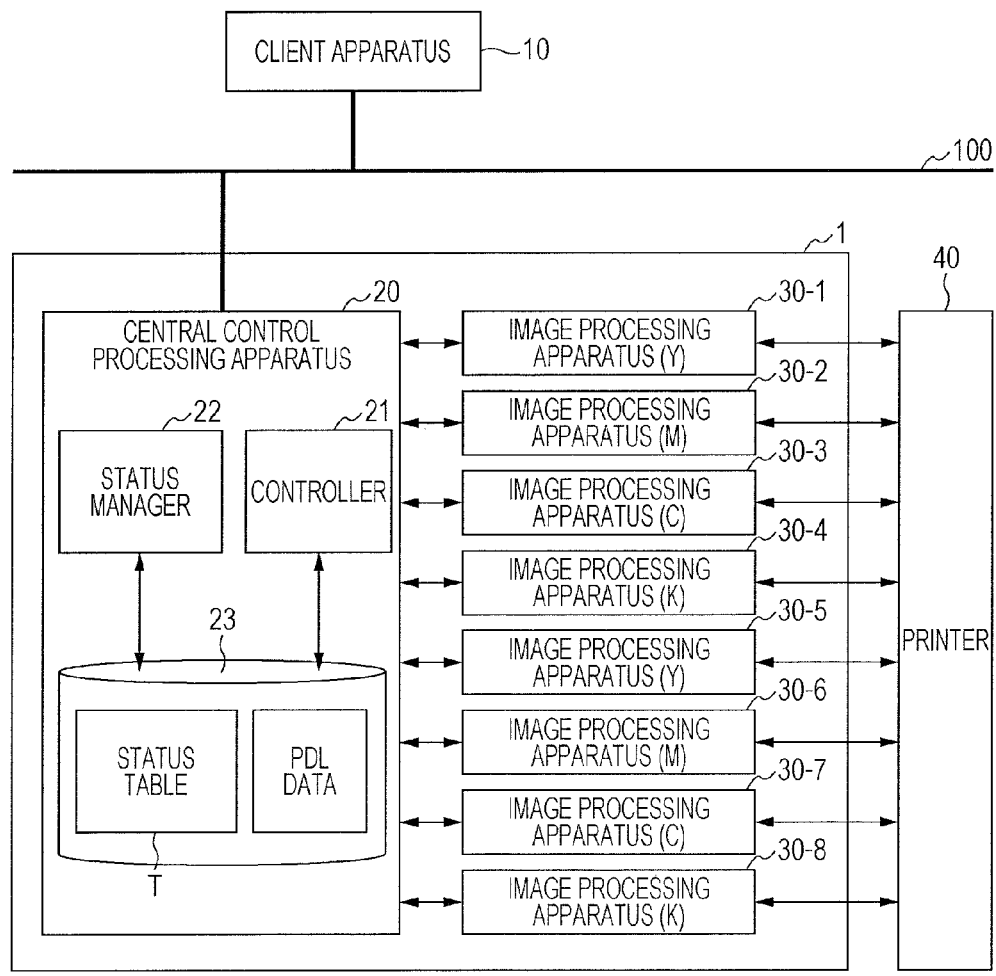
FIG. 1 is a block diagram illustrating an image processing system according to an exemplary embodiment of the present invention, and its surrounding configuration.
FIG. 2 is a diagram illustrating the configuration of a status table according to the exemplary embodiment.

FIG. 1 is a block diagram illustrating an image processing system 1 according to an exemplary embodiment of the present invention, and its surrounding configuration. The image processing system 1 outputs image data of multiple color components handled by a printer 40 to the printer 40. The printer 40 is an example of an image forming unit according to an exemplary embodiment of the present invention, and is a continuous paper printer here. The printer 40 forms a multi-color image on a sheet by performing an electrophotographic process based on image data in a raster format (hereinafter referred to as a "raster image") of four color components, namely, cyan (C), magenta (M), yellow (Y), and black (K). The printer 40 performs continuous printing that forms an image of each of multiple pages so that the order of the pages becomes continuous. The printer 40 also has the function of duplex printing for printing images on both sides of a sheet.

The image processing system 1 is connected to a client apparatus 10 via a communication line 100. Although the communication line 100 is, for example, a local area network (LAN) that performs communication in accordance with the standards of Ethernet (registered trademark), the communication line 100 may be a communication line other than that described above. In addition, the communication line 100 may be a wired line, a wireless link, or a line combining both a wired line and a wireless link.

The client apparatus 10 transmits an execution instruction for executing image processing to the image processing system 1. The execution instruction includes data in which processing of rendering images in units of pages is described using a page description language (PDL) (hereinafter referred to as "PDL data"). PDL data is an example of rendering data according to an exemplary embodiment of the present invention. In PDL data, typically processing of rendering images of multiple pages is described. Although examples of the page description language include LIPS (registered trademark) and PostScript (registered trademark), the page description language is not limited to these examples.

The image processing system 1 includes a central control processing apparatus 20 and multiple image processing apparatuses 30. Each of the image processing apparatuses 30 is an example of an image processor or an image processing apparatus according to an exemplary embodiment of the present invention. In the exemplary embodiment, the central control processing apparatus 20 and each of the multiple image processing apparatuses 30 are described as an apparatus in the form of a server.

The image processing system 1 includes eight image processing apparatuses 30-1 to 30-8, which serve as the multiple image processing apparatuses 30. Each of the image processing apparatuses 30-1 to 30-8 is a computer apparatus that is in charge of outputting a raster image of one of the four color components CMYK, indicated in the parentheses in FIG. 1. Specifically, the image processing apparatuses 30-1 and 30-5 are in charge of outputting a Y raster image; the image processing apparatuses 30-2 and 30-6 are in charge of outputting an M raster image; the image processing apparatuses 30-3 and 30-7 are in charge of outputting a C raster image; and the image processing apparatuses 30-4 and 30-8 are in charge of outputting a K raster image. Each of the image processing apparatuses 30-1 to 30-4 outputs to the printer 40 a raster image for forming an image on the front side of a sheet, and each of the image processing apparatuses 30-5 to 30-8 outputs to the printer 40 a raster image for forming an image on the back side of a sheet.

The central control processing apparatus 20 is a computer apparatus that controls the image processing system 1. Upon receipt of an execution instruction from the client apparatus 10 via the communication line 100, the central control processing apparatus 20 controls each of the image processing apparatuses 30-1 to 30-8 in order to execute image processing in accordance with the received execution instruction. The central control processing apparatus 20 includes a controller 21, a status manager 22, and a memory 23 storing a status table T.

The controller 21 is a processor that includes a central processing unit (CPU) serving as an arithmetic processing unit, for example, and a memory, and controls the entire image processing system 1. For example, the controller 21 controls the image processing apparatuses 30-1 to 30-8 to generate a raster image of four color components CMYK (hereinafter, referred to as a "CMYK raster image") for different pages. The image processing apparatus 30-$i$ (where i is a natural number from 1 to 8) generates a CMYK raster image for the 8(k−1)+i-th page (where k is a natural number).

The status manager 22 manages the status of each of the image processing apparatuses 30-1 to 30-8 by using the status table T having a configuration illustrated in FIG. 2. As illustrated in FIG. 2, in the status table T, an identification (ID) for identifying each of the image processing apparatuses and the number of a page whose CMYK raster image is stored in an HDD group 37 of that image processing apparatus 30 are associated with each other. The page refers to a page whose printing by the printer 40 is uncompleted. The IDs "ID001", "ID002", . . . , "ID008" correspond to the image processing apparatuses 30-1, 30-2, . . . , 30-8, respectively.

Figure 3:
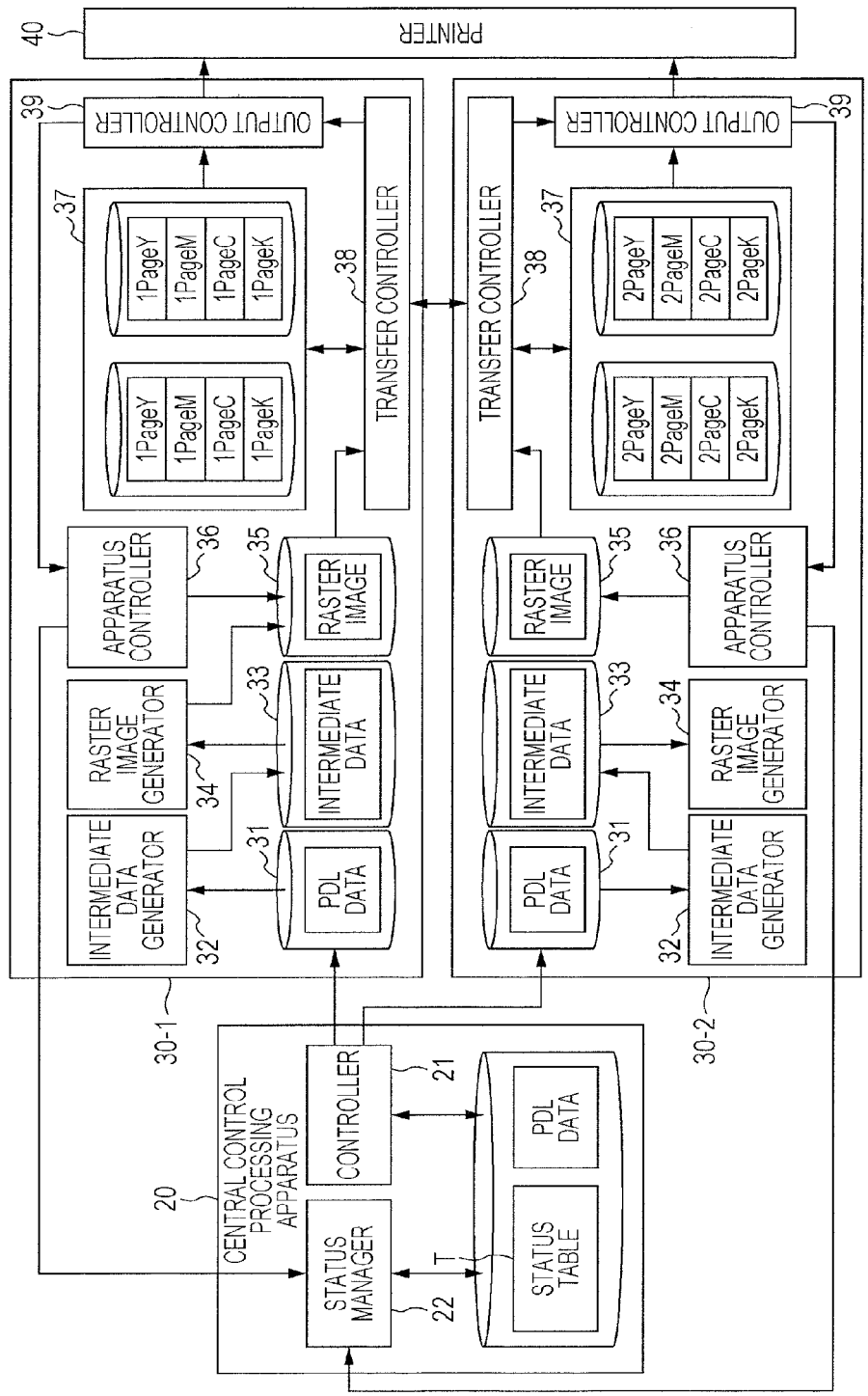
FIG. 3 is a block diagram illustrating the configuration of a central control processing apparatus and image processing apparatuses according to the exemplary embodiment.

FIG. 3 is a block diagram illustrating the configuration of the central control processing apparatus 20 and image processing apparatuses 30. FIG. 3 illustrates the image processing apparatus 30-1 and the image processing apparatus 30-2, among the image processing apparatuses 30-1 to 30-8. The image processing apparatuses 30-1 to 30-8 have substantially the same configuration except for the one color component of a raster image to handle. Thus, the configuration of the image processing apparatus 30-1 and the image processing apparatus 30-2 will be mainly described hereinafter. In the description of FIG. 3, the image processing apparatuses 30-1 to 30-8 are collectively referred to as an "image processing apparatus 30" whenever no distinction is made among the image processing apparatuses 30-1 to 30-8.

In response to reception of an execution instruction from the client apparatus 10, a memory 31 of the image processing apparatus 30 stores PDL data included in the execution instruction. An intermediate data generator 32 processes the PDL data read from the memory 31, and generates page-by-page intermediate data. The intermediate data generator 32 generates intermediate data of a page designated by the central control processing apparatus 20. A memory 33 stores intermediate data generated by the intermediate data generator 32. The memory 33 is configured to store intermediate data until a raster image generated from the intermediate data is output to the printer 40.

A raster image generator 34 is an example of a generator according to an exemplary embodiment of the present invention, and the raster image generator 34 processes intermediate data stored in the memory 33 and generates a CMYK raster image. A memory 35 stores a raster image generated by the raster image generator 34.

An apparatus controller 36 controls the entire image processing apparatus 30. The apparatus controller 36 obtains, for example, the number of a page whose printing is completed from the printer 40. The apparatus controller 36 notifies the status manager 22 of the central control processing apparatus 20 of a status including the number of that page, and a defect in the HDD group 37 if there is any. The apparatus controller 36 periodically communicates with the printer 40, and performs control for notifying the status manager 22 of the status.

The HDD group 37 is an example of an accumulator according to an exemplary embodiment of the present invention, and includes multiple hard disk drives (storage devices) for accumulating CMYK raster images. One HDD group 37 is allocated to each of the image processing apparatuses 30-1 to 30-8. Although two hard disk drives are illustrated in each HDD group 37 in FIG. 2, each HDD group 37 actually includes more numerous (such as twelve) hard disk drives. In each HDD group 37, a sufficiently large capacity is secured so as to be able to accumulate CMYK raster images of multiple pages. Each HDD group 37 buffers CMYK raster images for continuous printing performed by the printer 40. In order to implement fast reading/writing of raster images, multiple hard disk drives in each HDD group 37 are configured to implement striping. As illustrated in FIG. 3, each HDD group 37 divides a CMYK raster image for one page into image regions, for example, and stores these CMYK raster image portions separately in multiple hard disk drives.

Figure 4:
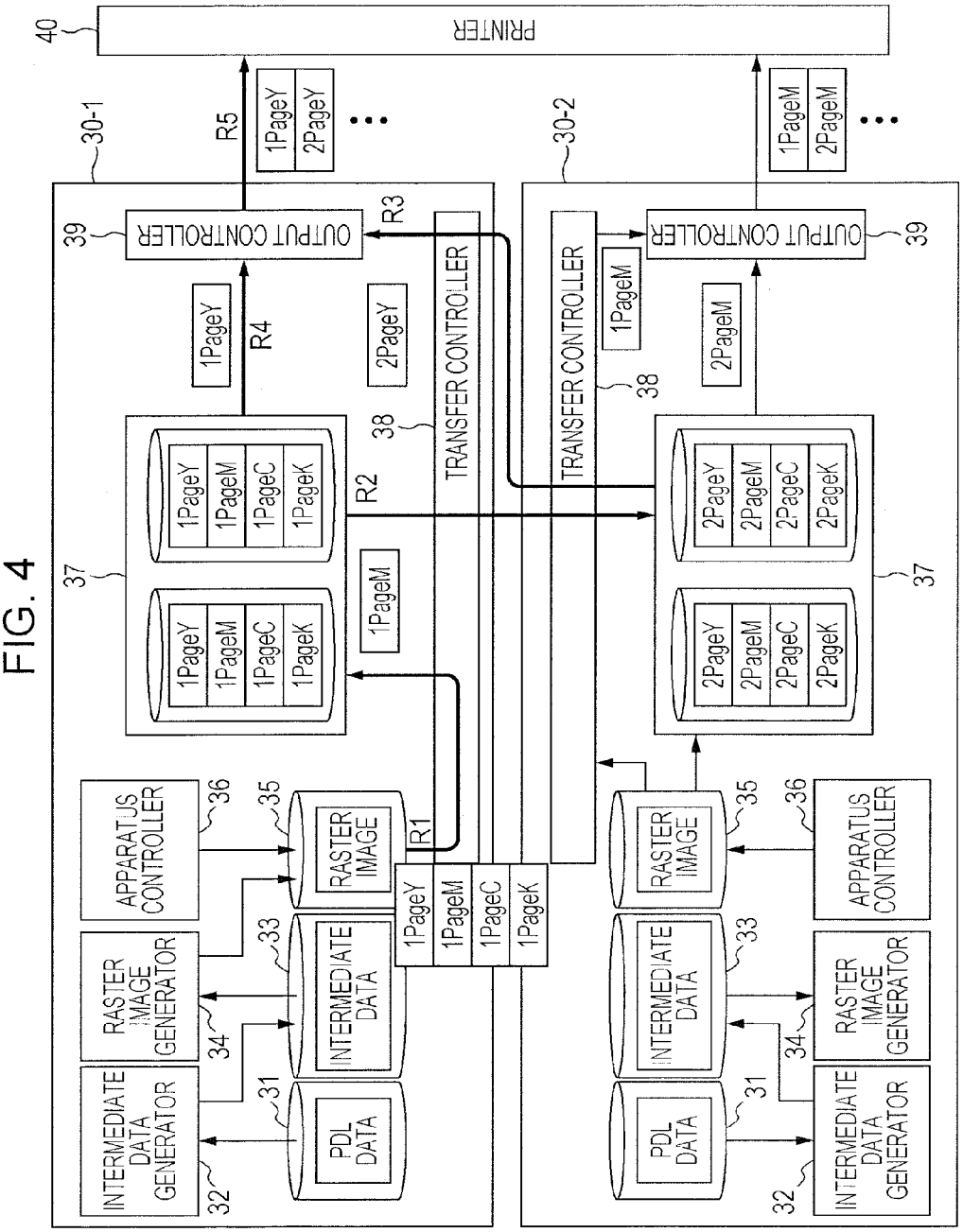
FIG. 4 is a diagram illustrating a transmission path of a raster image in the case where HDD groups according to the exemplary embodiment are normal.
Figure 5:
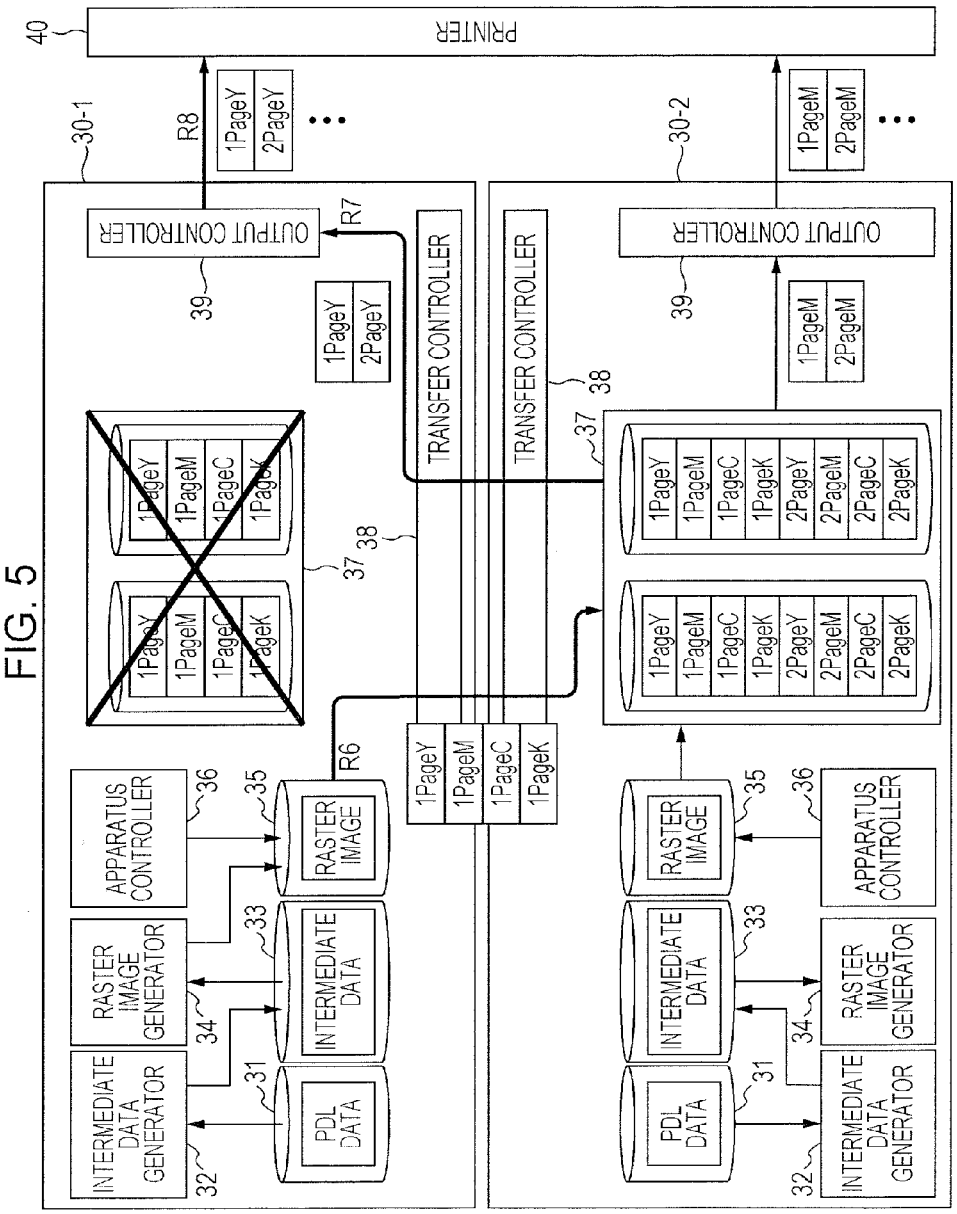
FIG. 5 is a diagram illustrating a transmission path of a raster image in the case where an HDD group according to the exemplary embodiment has a defect.

In FIG. 3 and later-described FIGS. 4 and 5, a raster image represented with the character string "XPageZ" refers to a raster image of Z color component for the X-th page.

A transfer controller 38 is an example of a transfer controller according to an exemplary embodiment of the present invention, and controls transfer of data that is performed with another image processing apparatus 30 other than the local image processing apparatus 30. The transfer controller 38 of the image processing apparatus 30-1 performs control to transfer a CMYK raster image, generated by the raster image generator 34 and stored in the memory 35, to the HDD group 37 (an example of a first accumulator) of the image processing apparatus 30-1 in the case where this HDD group 37 is normal, and to the HDD group 37 (an example of a second accumulator) of any one of the other image processing apparatuses 30 in the case where the HDD group 37 of the image processing apparatus 30-1 has a defect. Here, the transfer controller 38 of the image processing apparatus 30-1 has the image processing apparatus 30-2 as a transfer destination. The case in which the HDD group 37 is normal refers to the case in which data reading and writing from/to the HDD group 37 is possible. The case in which the HDD group 37 has a defect refers to the case in which at least one of data reading and writing from/to the HDD group 37 is impossible. A cause for a defect in the HDD group 37 is mostly a breakdown of the HDD group 37. In the case where at least one of the hard disk drives of the HDD group 37 breaks down, this is regarded that the HDD group 37 has a defect in the exemplary embodiment. The method of determining whether the HDD group 37 is normal or defective is not particularly limited. For example, in the case where the transfer controller 38 successfully stores a CMYK raster image in the HDD group 37, it is determined that the HDD group 37 is normal; and, in the case where the transfer controller 38 fails in storing a CMYK raster image in the HDD group 37, it is determined that the HDD group 37 has a defect.

In the following description, it is assumed that the HDD group 37 of the image processing apparatus 30-1 may have a defect, and the other HDD groups 37 are normal unless otherwise noted.

In addition, in the case where the HDD group 37 of the image processing apparatus 30-1 is normal, the transfer controller 38 of the image processing apparatus 30-1 performs control to transfer a raster image of color components whose output is taken charge of by the image processing apparatuses 30-2 to 30-8, from the HDD group 37 to the image processing apparatuses 30-2 to 30-8, respectively. The transfer controller 38 of the image processing apparatus 30-1 transfers, for example, an M raster image to the image processing apparatuses 30-2 and 30-6, a C raster image to the image processing apparatuses 30-3 and 30-7, and a K raster image to the image processing apparatuses 30-4 and 30-8. In addition, the transfer controller 38 of the image processing apparatus 30-1 transfers a Y raster image for printing on the back side to the image processing apparatus 30-5.

Note that the transfer controller 38 of the image processing apparatus 30-2 has the image processing apparatus 30-1 as a transfer destination and implements a function that is common to the transfer controller 38 of the image processing apparatus 30-1. In addition, the transfer controller 38 of each of the image processing apparatuses 30-3 to 30-8 controls transfer of data that is performed with a predetermined image processing apparatus serving as a transfer destination. For example, the image processing apparatuses 30-3 and 30-4, the image processing apparatuses 30-5 and 30-6, and the image processing apparatuses 30-7 and 30-8 have each other as a transfer destination.

An output controller 39 is an example of an output controller according to an exemplary embodiment of the present invention, and performs control to output to the printer 40 raster images of a color component whose output is taken charge of by the local image processing apparatus 30, in the order of pages (in ascending order here). The output controller 39 of the image processing apparatus 30-1 performs control to output a Y raster image accumulated in the HDD group 37 and Y raster images transferred from the image processing apparatuses 30-2 to 30-8 to the printer 40 in the order of pages.

Note that the intermediate data generator 32, the raster image generator 34, the apparatus controller 36, the transfer controller 38, and the output controller 39 of the image processing apparatus 30 are implemented by, for example, a processor including a CPU serving as an arithmetic processing unit and a memory.

Next, the operation according to the exemplary embodiment will be described. FIG. 4 is a diagram illustrating a transmission path of a raster image in the case where the HDD group 37 of the image processing apparatus 30-1 is normal. FIG. 5 is a diagram illustrating a transmission path of a raster image in the case where the HDD group 37 of the image processing apparatus 30-1 has a defect. Hereinafter, the operation of the image processing apparatuses 30-1 and 30-2 will be described with reference to FIGS. 4 and 5.

Figure 6:
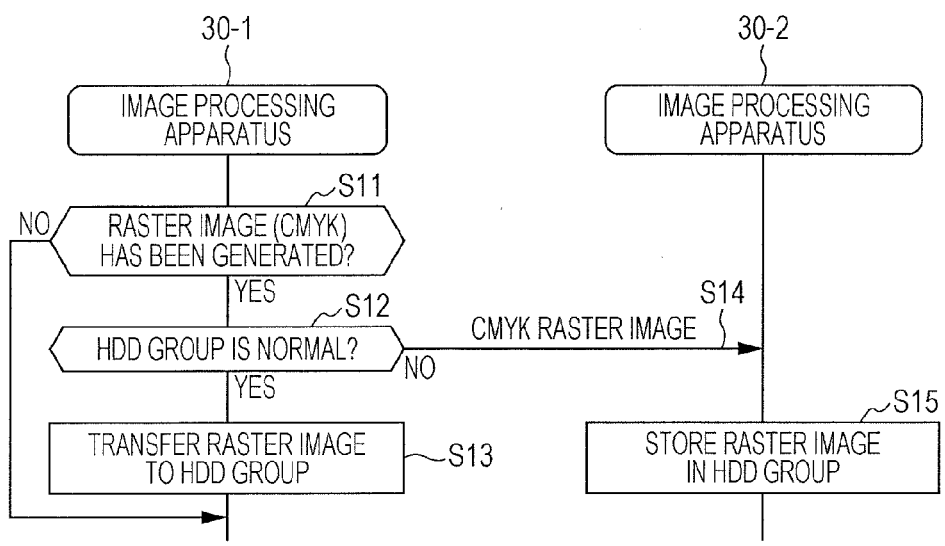
FIG. 6 is a sequence diagram illustrating control performed by a transfer controller at the time a raster image is generated according to the exemplary embodiment.

FIG. 6 is a sequence diagram illustrating control performed by the transfer controllers 38 of the image processing apparatuses 30-1 and 30-2 in the case where the image processing apparatus 30-1 generates a CMYK raster image.

The transfer controller 38 of the image processing apparatus 30-1 determines whether a CMYK raster image has been generated by the raster image generator 34 (step S11). In the case where it is determined "YES" in step S11, the transfer controller 38 determines whether the HDD group 37 is normal (step S12). In the case where it is determined that the HDD group 37 is normal (YES in step S12), the transfer controller 38 transfers the generated CMYK raster image from the memory 35 to the HDD group 37 of the image processing apparatus 30-1 (step S13). The transfer controller 38 transfers, for example, as illustrated in the arrow R1 in FIG. 4, the CMYK raster image of the first page to the HDD group 37.

In the case where it is determined in step S12 that the HDD group 37 has a defect (NO in step S12), the transfer controller 38 of the image processing apparatus 30-1 transfers the generated CMYK raster image from the memory 35 to the HDD group 37 of the image processing apparatus 30-2 (step S14). Upon receipt of the transferred CMYK raster image, the transfer controller 38 of the image processing apparatus 30-2 transfers the transferred CMYK raster image to the HDD group 37 of the image processing apparatus 30-2 and stores the CMYK raster image therein (step S15). The transfer controller 38 of the image processing apparatus 30-1 transfers, for example, as illustrated in the arrow R6 in FIG. 5, the CMYK raster image of the first page to the HDD group 37 of the image processing apparatus 30-2.

In the case where it is determined "NO" in step S11, the transfer controller 38 ends the process of FIG. 6.

Figure 7:
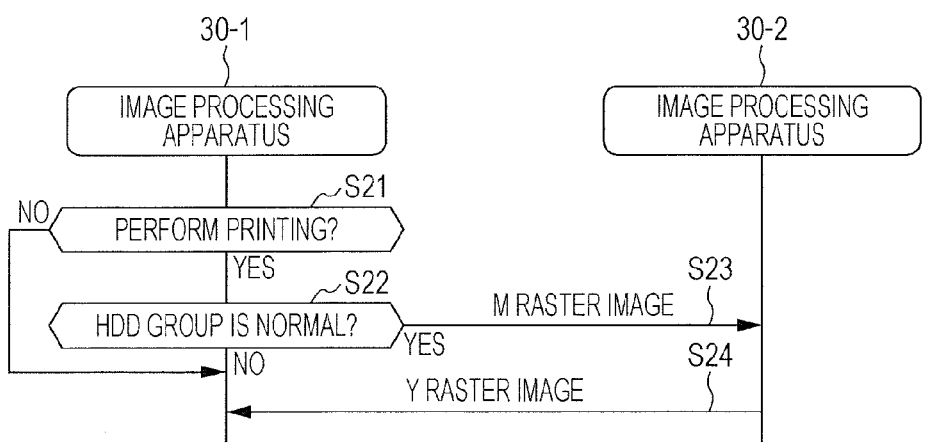
FIG. 7 is a sequence diagram illustrating control performed by the transfer controller at the time printing is performed according to the exemplary embodiment.

FIG. 7 is a sequence diagram illustrating control performed by the transfer controllers 38 of the image processing apparatuses 30-1 and 30-2 in the case where the printer 40 will perform printing. The transfer controller 38 of the image processing apparatus 30-1 determines whether printing will be performed (step S21). In the case where it is determined "YES" in step S21, the transfer controller 38 determines whether the HDD group 37 is normal (step S22). In the case where it is determined that the HDD group 37 is normal (YES in step S22), the transfer controller 38 transfers a M raster image, the color of which is the color that the image processing apparatus 30-2 is in charge of, from the HDD group 37 of the image processing apparatus 30-1 to the image processing apparatus 30-2. The transfer controller 38 of the image processing apparatus 30-1 transfers, for example, as illustrated in the arrow R2 in FIG. 4, the M raster image of the first page to the image processing apparatus 30-2.

In addition, the transfer controller 38 of the image processing apparatus 30-2 transfers a Y raster image, the color of which is the color that the image processing apparatus 30-1 is in charge of, from the HDD group 37 of the image processing apparatus 30-2 to the image processing apparatus 30-1 (step S24). The transfer controller 38 of the image processing apparatus 30-2 transfers, as illustrated in the arrow R3 in FIG. 4, the Y raster image of the second page to the image processing apparatus 30-1.

In the case where it is determined "NO" in step S21 or S22, the transfer controller 38 ends the process of FIG. 7.

Figure 8:
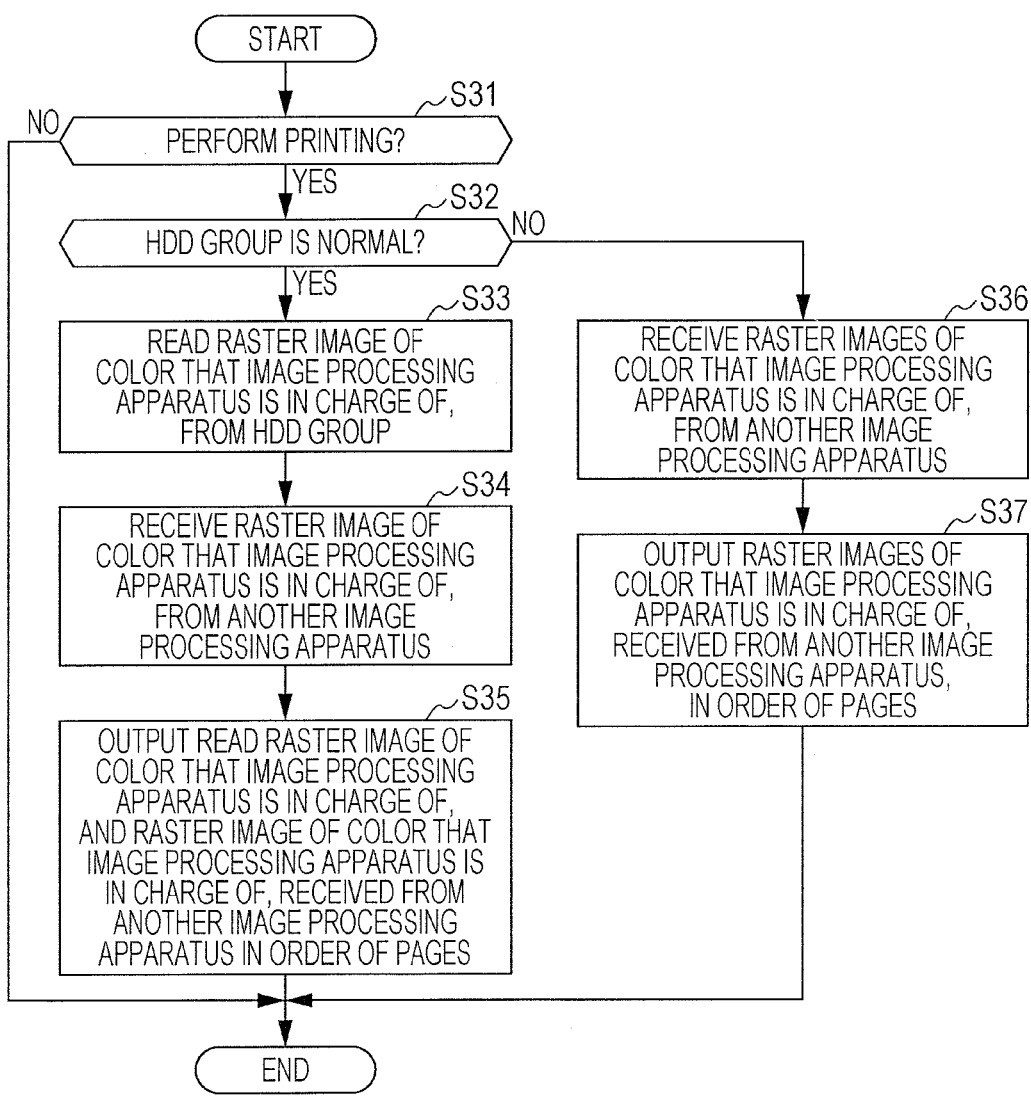
FIG. 8 is a flowchart illustrating control performed by an output controller according to the exemplary embodiment.

FIG. 8 is a flowchart illustrating control performed by the output controller 39 of the image processing apparatus 30-1. The output controller 39 determines whether printing will be performed (step S31). In the case where it is determined "YES" in step S31, the output controller 39 determines whether the HDD group 37 of the image processing apparatus 30-1 is normal (step S32). In the case where it is determined that the HDD group 37 is normal (YES in step S32), the output controller 39 reads, from among CMYK raster images accumulated in the HDD group 37, a Y raster image, the color of which is the color that the image processing apparatus 30-1 is in charge of (step S33). The output controller 39 of the image processing apparatus 30-1 reads, for example, as illustrated in the arrow R4 in FIG. 4, the Y raster image of the first page.

Next, the output controller 39 receives a Y raster image, the color of which is the color that the image processing apparatus 30-1 is in charge of, from another image processing apparatus 30 (step S34). The raster image is, for example, the raster image transmitted in step S24. The output controller 39 of the image processing apparatus 30-1 receives, for example, as illustrated in the arrow R3 in FIG. 4, the Y raster image of the second page from the image processing apparatus 30-2 via the transfer controller 38.

The output controller 39 outputs the Y raster images, the color of which is the color that the image processing apparatus 30-1 is in charge of, in the order of pages to the printer 40 (step S35). That is, in the case where the HDD group 37 is normal, the output controller 39 outputs, as illustrated in the arrow R5 of FIG. 4, the Y raster image of the first page accumulated in the HDD group 37 of the image processing apparatus 30-1 and the Y raster image of the second page transferred from the image processing apparatus 30-2 in the order of the pages.

In the case where it is determined in step S32 that the HDD group 37 has a defect (NO in step S32), the output controller 39 receives Y raster images, the color of which is the color that the image processing apparatus 30-1 is in charge of, from another image processing apparatus 30 (step S36). The output controller 39 of the image processing apparatus 30-1 receives, for example, as illustrated in the arrow R7 in FIG. 5, the Y raster images of the first page and the second page from the image processing apparatus 30-2 via the transfer controller 38.

The output controller 39 of the image processing apparatus 30-1 outputs the Y raster images, the color of which is the color that the image processing apparatus 30-1 is in charge of, to the printer 40 in the order of pages (step S37). That is, in the case where the HDD group 37 has a defect, the output controller 39 outputs, as illustrated in the arrow R8 of FIG. 5, Y raster images transferred from another image processing apparatus 30 in the order of pages, without using the HDD group 37 of the image processing apparatus 30-1.

The operation of the image processing apparatus 30-1 is as described above. Since the operation of each of the image processing apparatuses 30-2 to 30-8 is understandable by analogy with the above description, descriptions thereof will be omitted.

By the way, in the case where the HDD group 37 of one or some of the image processing apparatuses 30-1 to 30-8 has a defect, the amount of data of raster images transferred to the printer 40 per unit time becomes smaller than that in the case where there is no defect. One of the causes thereof is primarily an increase in the number of raster images to be handled by each image processing apparatus 30. Therefore, in the case where the HDD group 37 of part of the image processing system 1 has a defect, insufficiency in raster images to be transferred to the printer 40 may cause intermittent printing, such as some pages falling out or blank pages being inserted. To this end, the controller 21 of the central control processing apparatus 20 has the function of calculating the processing speed of the printer 40 in order to prevent intermittent printing from occurring. That is, the controller 21 is an example of a calculator according to an exemplary embodiment of the present invention.

Figure 9:
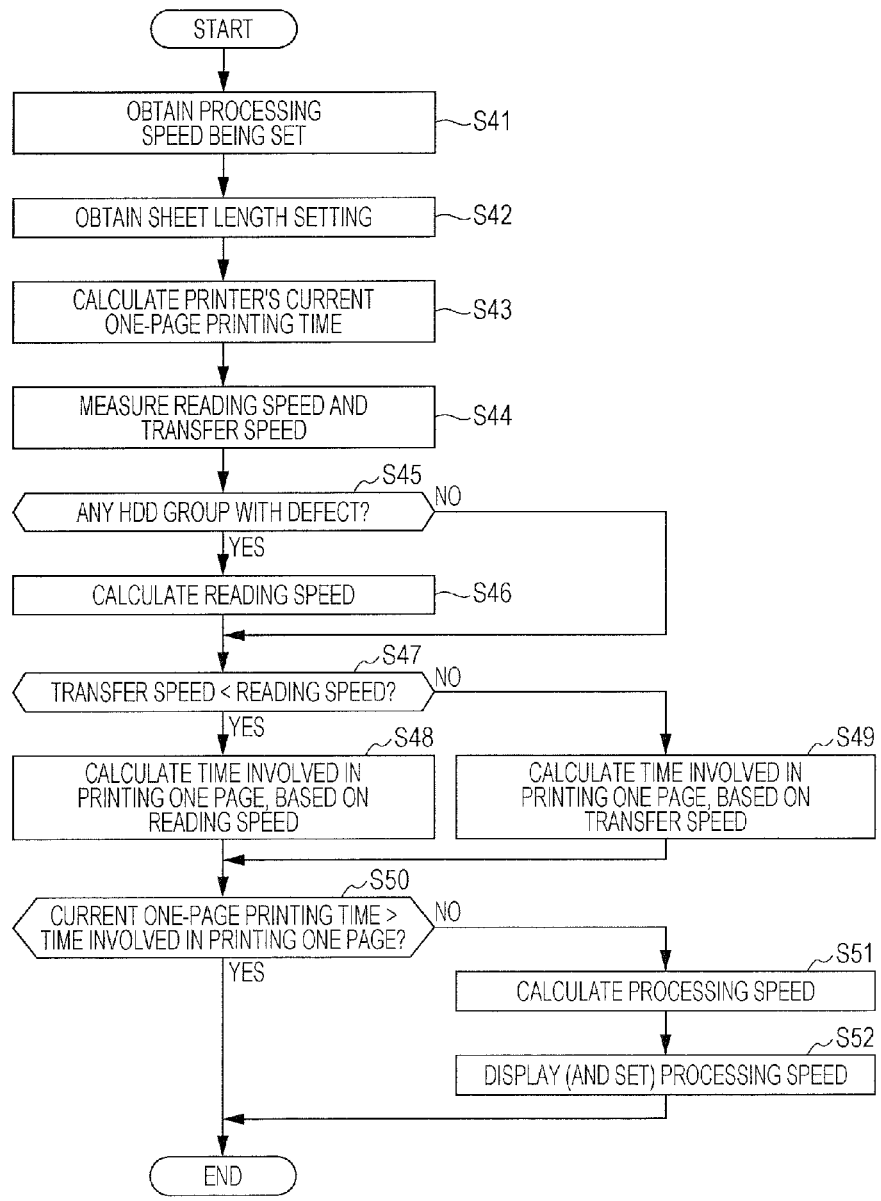
FIG. 9 is a flowchart illustrating control performed by a controller of the central control processing apparatus according to the exemplary embodiment.

FIG. 9 is a flowchart illustrating control performed by the controller 21 of the central control processing apparatus 20.

First, the controller 21 obtains the currently set processing speed from the printer 40 (step S41). It is assumed that the processing speed here is "100 m/minute", which indicates that continuous printing equivalent to 100 m is performed per minute. Although the printing resolution is not particularly limited, the printing resolution is, for example, 1200 dpi. Next, the controller 21 obtains a sheet length setting (step S42). The sheet length is the length in a carrying direction of a sheet used for printing by the printer 40, and it is assumed that the sheet length is set to 12 inches (=30.48 cm).

Next, the controller 21 calculates the current one-page print processing time of the printer 40 (step S43). Here, it is assumed that the data reading speed of the HDD group 37 is 2 GB/second, and a raster image of one page of one color component (that is, a raster image of one version) is 96 MB. In this case, the controller 21 calculates that the current one-page print processing time is 100 (m/minute)/30.48 cm×1/60=0.18288 seconds.

Next, the controller 21 calculates the raster image reading speed and transfer speed (step S44). The reading speed is the volume of data that is readable from the HDD group 37 per unit time. The transfer speed is the volume of data transferrable between image processing apparatuses 30 per unit time.

Next, the controller 21 determines whether there is a defective HDD group 37 in the image processing system 1 (step S45). In the case where it is determined "NO" in step S45, the controller 21 determines whether the transfer speed calculated in step S44 is less than the reading speed (step S47). In the case where it is determined "YES" in step S47, the controller 21 calculates the amount of time involved in printing one page, by using the reading speed (step S48). In the case where it is determined "NO" in step S47, the controller 21 calculates the amount of time involved in printing one page, by using the transfer speed (step S49). In step S48, the controller 21 calculates the expression 1/(reading speed/volume of data of a raster image of one version), and, in step S49, the controller 21 calculates the expression 1/(transfer speed/volume of data of a raster image of one version).

Next, the controller 21 determines whether the current one-page print processing time, calculated in step S43, is greater than the amount of time involved in printing one page, calculated in step S48 or S49 (step S50). In the case where there is no defective HDD group 37, the printing time of one page is 0.18288 seconds, whereas the amount of time involved in printing one page is 1/(2 GB/96 MB)=0.04 seconds. In this case, continuous printing is possible at the current processing speed of the printer 40. Therefore, the controller 21 determines "YES" in step S50, and ends the process of FIG. 9.

In the case where it is determined "YES" in step S45, the controller 21 calculates the reading speed again by calculating the expression reading speed×(the total number of HDD groups 37—the number of defective HDD groups 37/the total number of HDD groups 37) (step S46). In the case where there is a defective HDD group 37, the speed of reading a raster image of one version decreases. For example, the case will be discussed in which the data reading speed of each HDD group 37 is 500 MB/second, a raster image of one version has 96 MB, and there are two defective HDD groups 37. In this case, the controller 21 calculates the expression 1/(500 MB×(4−2)/4/96 MB)=0.384 seconds in step S48. In the case where the reading speed is greater than or equal to the transfer speed, since the current one-page print processing time is 0.18288 seconds, continuous printing is impossible at the current processing speed of the printer 40. Therefore, the controller 21 determines "NO" in step S50, and calculates a processing speed at which continuous printing is possible (step S51). Here, the controller 21 calculates the expression 60/amount of time involved in printing one page (seconds)×sheet length setting (cm)×0.9. The numeral "0.9" is a value for a margin of the processing speed and is determined in advance. With this calculation, the controller 21 calculates a processing speed of 42.8 m/minute.

Next, the controller 21 performs, as processing in accordance with the calculated processing speed, processing of displaying the processing speed on a display apparatus (not illustrated) (step S52). The controller 21 is an example of a processor according to an exemplary embodiment of the present invention.

Figure 10:
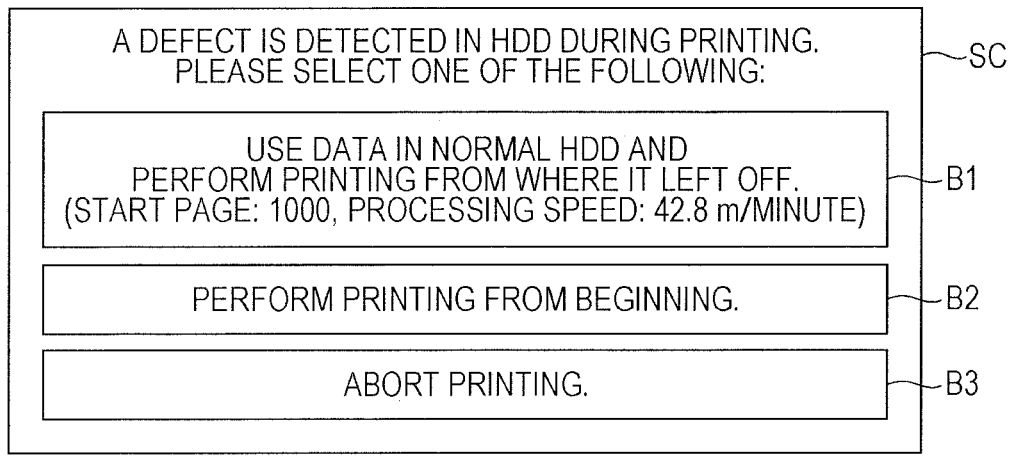
FIG. 10 is an explanatory diagram of control performed by the controller of the central control processing apparatus according to the exemplary embodiment.

FIG. 10 is a diagram illustrating an example of displaying the processing speed. The controller 21 displays a screen SC where operator images B1 to B3 representing operators are arranged. In the operator image B1, the character string "Use data in normal HDD and perform printing from where it left off (start page: 1000, processing speed 42.8 m/minute)" is indicated. That is, the operator image B1 includes the start page in the case of resuming printing, and the processing speed calculated in step S51. The start page in the case of resuming printing is the first page of pages whose printing is uncompleted. The controller 21 refers to the status table T, and identifies, as a page to resume printing, the first page of pages whose printing by the printer 40 is uncompleted, which are pages whose YMCK raster images are stored in the HDD group 37. In the case where the operator image B1 is selected, the controller 21 sets the processing speed of the printer 40 to 42.8 m/minute calculated in step S51. In order to start generating a raster image of the 1000-th page, which is the start page, the controller 21 gives an instruction to each image processing apparatus 30 having a normal HDD group 37. In response to this instruction, the raster image generator 34 of the image processing apparatus 30 generates again raster images for pages whose CMYK raster images are stored in the HDD group 37. Here, the raster image generator 34 processes intermediate data stored in the memory 33 and generates CMYK raster images. In this case, for pages whose CMYK raster images remain stored in the memory 35, the raster image generator 34 does not have to generate raster images again.

In the operator image B2, the character string "Perform printing from beginning" is indicated. For example, in the case where a hard disk drive of the HDD group 37 is replaced with a new one and then the operator image B2 is selected, the controller 21 starts printing from the first page. In this case, the controller 21 does not have to set the processing speed again.

In the operator image B3, the character string "Abort printing" is indicated. In the case where the operator image B3 is selected, the controller 21 ends continuous printing. Also in this case, the controller 21 does not have to set the processing speed again.

In the image processing system 1 according to the above-described exemplary embodiment, each of the multiple image processing apparatuses 30 generates a CMYK raster image, and, in the case where there is a defect in the HDD group 37 of the local image processing apparatus 30, the image processing apparatus 30 transfers the raster image to any of the HDD groups 37 of the other image processing apparatuses 30. Each of the multiple image processing apparatuses 30 obtains raster images of a color component whose output is taken charge of by the local image processing apparatus 30, from the other image processing apparatuses 30, and outputs the raster images to the printer 40. Accordingly, in the case where processing of generating a raster image of multiple color components from PDL data or intermediate data and outputting the raster image is performed by multiple image processing apparatuses 30, even in the case where one or some image processing apparatuses 30 have a defective HDD group(s) 37, the processing is continued. This may reduce a delay in continuous printing, which is caused by time involved in exchanging a hard disk drive(s) of the HDD group(s) 37. Also in the image processing system 1, even in the case where any of the HDD groups 37 has a defect, it is not necessary to start printing again from the beginning. Therefore, an increase in the amount of time involved in continuously printing all pages is reduced. In addition, since the central control processing apparatus 20 has the function of calculating and setting again the processing speed, a failure such as intermittent printing becomes less likely to occur after a defect occurs in the HDD group 37.

Modifications

The present invention may be implemented in embodiments different from that described above. The following modifications may be combined.

In the case where there is a defect in the HDD group 37 of the local image processing apparatus 30, the transfer controller 38 may be configured to dynamically change an image processing apparatus 30 serving as a transfer destination. For example, for each page, the transfer controller 38 may select an image processing apparatus 30 as a transfer destination. The transfer controller 38 selects any one of the image processing apparatuses 30 in a determined order or randomly. Accordingly, the processing load becomes less concentrated, compared with the case where only a specific image processing apparatus(es) 30 perform(s) image processing.

In addition, the transfer controller 38 may select any one of the image processing apparatuses 30 as a transfer destination, on the basis of the processing load on each of the other image processing apparatuses 30 or the capacity of each HDD group 37. The processing load is identified by the CPU utilization of a processing circuit such as the transfer controller 38; however, another index may be used. The capacity of each HDD group 37 may be identified by the entire capacity thereof, or may be identified by the space left therein. The transfer controller 38 selects an image processing apparatus 30 whose processing load is minimum or whose HDD group 37 has the largest capacity. Accordingly, a delay in the processing becomes less, compared with the case in which the transfer controller 38 does not determine the transfer destination on the basis of the processing load or the capacity of the HDD group 37.

Part of the configuration or operation of the image processing apparatus 30 according to the above-described exemplary embodiment may be omitted.

For example, a function corresponding to the intermediate data generator 32 may be performed by an apparatus outside the image processing apparatus 30. The order of processes performed by the image processing apparatus 30 may be changed.

The one color components handled in the image processing system 1 according to the exemplary embodiment of the present invention are not limited to the four colors CMYK, and color components other than these colors may be handled. Alternatively, two or fewer colors or five or more colors may be handled. The number of image processing apparatuses 30 in the image processing system 1 may also be changed in accordance with the number of color components to be handled. In addition, the printer 40 may not have the duplex printing function, and may be configured to perform one-side printing. The above-described calculation expressions are only exemplary.

Hardware that centrally performs control of reading/writing raster images from/to the HDD group 37 or writing (outputting) raster images is not limited to that described in the above-described exemplary embodiment.

The functions of the central control processing apparatus 20 described in the above-described exemplary embodiment may be implemented by the image processing apparatus 30.

Although the image processing system 1 with multiple image processing apparatuses 30 has been described in the above-described exemplary embodiment, functions implemented by the image processing system 1 may be implemented by a single image processing apparatus. The image processing apparatus in this modification has multiple image processors for implementing functions that are common to each of the multiple image processing apparatuses 30 described in the above-described exemplary embodiment. Each of the multiple image processors is an example of an image processor according to an exemplary embodiment of the present invention, and is implemented by hardware such as an image processing board. In the image processing apparatus in this modification, an accumulator (corresponding to the HDD group 37) for accumulating a CMYK raster image is allocated to each of the multiple image processors.

The accumulator need not be an element of each image processor, and may be an external element outside the image processor. Alternatively, instead of having the central control processing apparatus 20 as an independent apparatus, the central control processing apparatus 20 may be implemented as a function of the image processing apparatus in this modification.

Each function (such as the transfer controller 38) implemented by the image processing system or the image processing apparatus described in the above-described exemplary embodiment and modification may be implemented by one or multiple hardware circuits, may be implemented by executing one or multiple programs for causing a computer to execute the function, or may be implemented by a combination thereof. In the case where each function of the image processing system or the image processing apparatus is implemented by using a program, the program may be stored in a computer-readable recording medium such as a magnetic recording medium (a magnetic tape, a magnetic disk (HDD, flexible disk (FD), etc.), an optical recording medium (optical disk, etc.), a magneto-optical recording medium, or a semiconductor memory and provided, or may be distributed through a communication line such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a plurality of image processors; and
a memory storing computer readable instructions configured to cause the image processors to output, on the basis of rendering data in which processing of rendering an image for each of a plurality of pages is described, image data of one color component of a plurality of color components handled by an image forming unit configured to form an image, the one color component being a color that the image processor is in charge of, to the image forming unit,
wherein the memory storing computer readable instructions is further configured to cause each of the plurality of image processors to implement:
an accumulator configured to accumulate the image data of the plurality of color components,
a generator configured to process the rendering data, and, for a page that is different among the plurality of image processors, to generate the image data of the plurality of color components,
a transfer controller configured to perform control to transfer the generated image data of the plurality of color components to the accumulator of a local image processor in a case where the accumulator of the local image processor is normal, and to an accumulator of another image processor in a case where the accumulator of the local image processor has a defect, and wherein the local image processor is configured to, in a case where the accumulator of the local image processor is normal, perform control to transfer the image data of color components whose output is taken charge of by the another image processor, from the accumulator of the local image processor to the another image processors, respectively, and an output controller configured to perform control to output the image data of the one of the plurality of color components accumulated in the accumulator of the local image processor, and image data of the one of the plurality of color components, transferred from the another image processor, in an order of pages to the image forming unit, and wherein an accumulator of the another image processor of the plurality of image processors is configured to, in a case where a first image processor of the plurality of image processors has the defect, accumulate both a first portion, comprising a first plurality of color components of a first page of the image data, and a second portion, comprising a second plurality of color components of a second page of the image data, and to output at least a first part of the first portion to a first output controller local to the first image processor and to output at least a second part of the second portion to a second output controller local to the another image processor.

2. The image processing system according to claim 1, further comprising:

a calculator configured to calculate a processing speed of forming the image to be set to the image forming unit, on the basis of a number of normal accumulators in the image processing system and a speed of reading or transferring data from the accumulator, and a processor configured to perform processing in accordance with the speed calculated by the calculator.

3. The image processing system according to claim 2, wherein the processor is further configured to set the calculated speed to the image forming unit in a case where the calculated speed is lower than the speed currently set to the image forming unit.

4. The image processing system according to claim 1, wherein the transfer controller is further configured to perform control to, in a case where the accumulator of the local image processor has a defect, select any one of the image processors for each page, and transfer the generated image data of the plurality of color components.

5. The image processing system according to claim 1, wherein the transfer controller is further configured to perform control to, in a case where the accumulator of the local image processor has a defect, select any one of the image processors on the basis of a processing load on each of the other image processors or a capacity of the accumulator of each of the other image processors, and transfer the generated image data of the plurality of color components.

6. An image processing apparatus comprising:
a plurality of image processors, and
a memory storing computer readable instructions configured to cause the plurality of image processors to implement:
an accumulator configured to accumulate image data of a plurality of color components handled by an image forming unit that forms a transferred image;
a generator configured to process rendering data in which processing of rendering an image for each of a plurality of pages is described, and, for a page different from those handled by another image processing apparatuses that process the rendering data, to generate the image data of the plurality of color components;

a transfer controller configured to perform control to transfer the generated image data of the plurality of color components to the accumulator of the image processing apparatus in a case where the accumulator of the image processing apparatus is normal, and to an accumulator of the another image processing apparatus of the other image processing apparatuses in a case where the accumulator of the image processing apparatus has a defect, and the image processing apparatus is further configured to, in a case where the accumulator of the image processing apparatus is normal, control to transfer the image data of color components whose output is taken charge of by the another image processing apparatus, from the accumulator of the image processing apparatus to the another image processing apparatus, respectively, and an output controller configured to perform control to output the image data, accumulated in the accumulator of the image processing apparatus, of one of the plurality of color components, the one of the plurality of color components being a color that the image processing apparatus is in charge of, and to output the image data of another color component transferred from the another image processing apparatuses in an order of pages to the image forming unit, wherein an accumulator of the another image processing apparatus is configured to, in a case where the first image processing apparatus has the defect, accumulate both a first portion, comprising a first plurality of color components of a first page of the image data, and a second portion, comprising a second plurality of color components of a second page of the image data, and to output at least a first part of the first portion to the output controller local to the first image processing apparatus and to output at least a second part the second portion to a second output controller local to the another image processing apparatus.

7. An image processing apparatus comprising:
a plurality of image processors; and
a memory storing computer readable instructions configured to cause the image processors to output, on the basis of rendering data in which processing of rendering an image for each of a plurality of pages is described, image data of one color component of a plurality of color components handled by an image forming unit configured to form an image, the one color component being a color that a local image processor of a plurality of other image processors is in charge of, to the image forming unit; and
the computer reasonable instructions are further configured to cause the image processors to implement:
a plurality of accumulators configured to accumulate the image data of the plurality of color components, the plurality of accumulators being allocated to the plurality of image processors, respectively,
a generator configured to process the rendering data, and, for a page that is different among the plurality of image processors, to generate the image data of the plurality of color components,
a transfer controller configured to perform control to transfer the generated image data of the plurality of color components to an accumulator allocated to the local image processor in a case where the accumulator allocated to the local image processor is normal, and to the accumulator allocated to another image processor of the other image processors in a case where the accumulator allocated to the local image processor has a defect, and the local image processor is further configured to, in a case where the accumulator allocated to the local image processor is normal, perform control to transfer the image data of color components whose output is taken charge of by the another image processor, from the accumulator allocated to the local image processor to the another image processor, respectively, and an output controller configured to perform control to output the image data of the one of the plurality of color components accumulated in the accumulator allocated to the local image processor, and image data of the one of the plurality of color components transferred from the another image processor, in an order of pages to the image forming unit, and in a case where a first image processor of the plurality of image processors has the defect:

an accumulator of the another image processor of the plurality of image processors is configured to accumulate both a first portion, comprising a first plurality of color components of a first page of the image data, and a second portion of the image data and to output at least a first part of the first portion to a first output controller local to the first image processor and to output at least a second part of the second portion to a second output controller local to the another image processor.

8. An image processing method executed by a computer, the computer including local image processor configured to perform control to process rendering data in which processing of rendering an image for each of a plurality of pages is described, to generate image data of a plurality of color components handled by an image forming unit for a page different from those handled by another image processor configured to process the rendering data, and to output image data of one color component that the local image processor is in charge of, the image data being accumulated in a first accumulator allocated to the local image processor, and image data of the one color component transferred from the another image processor, in an order of pages to the image forming unit, the method comprising:

performing control to transfer the image data of the plurality of color components, generated by the local image processor, to a first accumulator in a case where the first accumulator is normal, and to a second accumulator allocated to the another image processor in a case where the first accumulator has a defect;

performing control to, in a case where the first accumulator is normal, transfer the image data of color components whose output is taken charge of by the another image processor, from the first accumulator to the another image processor, respectively; and accumulating, by the another accumulator of the another image processor of the plurality of other image processors and in a case where the local image processor of the plurality of image processors has the defect, both a first portion, comprising a first plurality of color components of the image data, and a second portion, comprising a second plurality of color components of the image data, and outputting, by the second accumulator, at least a first part of the first portion to a first output controller local to the local image processor and outputting, by the second accumulator, at least a second part of the second portion to a second output controller local to the another image processor.

9. A non-transitory computer readable medium storing a program causing a computer to execute a process, the computer including a local image processor configured to perform control to process rendering data in which processing of rendering an image for each of a plurality of pages is described, to generate image data of a plurality of color components handled by an image forming unit for a page different from those handled by another image processor configured to process the rendering data, and to output image data of one color component that the local image processor is in charge of, the image data being accumulated in a first accumulator allocated to the local image processor, and image data of the one color component transferred from the another image processor, in an order of pages to the image forming unit, the process comprising:

performing control to transfer the image data of the plurality of color components, generated by the local image processor, to a first accumulator in a case where the first accumulator is normal and to a second accumulator allocated to one of the another processor in a case where the first accumulator has a defect;

performing control to, in a case where the first accumulator is normal, transfer the image data of color components whose output is taken charge of by the another image processor, from the first accumulator to another image processor, respectively; and accumulating, by the second accumulator of the another image processor of the plurality of other image processors and in a case where the local image processor of the plurality of image processors has the defect, both a first portion, comprising a first plurality of color components of a first page of the image data, and a second portion, comprising a second plurality of color components of a second page of the image data, and outputting, by the second accumulator, at least a first part of the first portion to a first output controller local to the local image processor and outputting, by the second accumulator, at least a second part of the second portion to a second output controller local to the another image processor.

10. The image processing system according to claim 1, wherein the second accumulator is further configured to, in the case where the local image processor of the plurality of image processors has the defect, output at least a third part of the second portion to the first output controller and a fourth part of the first portion to the second output controller, wherein the at least first part and the third part comprise a first color, and the at least second part and the fourth part comprise a second color different than the first color.

11. The image processing system according to claim 1, wherein the image processing system is configured such that, in the case where the first image processor is normal:

an accumulator of the first image processor is configured to accumulate the first image data representing a plurality of color components of a first page of the plurality of pages, the another image processor is configured to accumulate the second image data representing a plurality of color components of a second page of the plurality of pages, the another image processor is further configured to transfer a second portion of the second image data to the first image processor, the first image processor is configured to transfer a first portion, of the first image data, and the portion of the second image data to the first output controller, and the first portion and the second portion respectively represent a same first color component for the first page and the second page.

12. The image processing system according to claim 11, wherein image processing system is configured such that, in the case where the first image processor is normal:

the first image processor is further configured to transfer a third portion of the first image data to the another image processor, and the another image processor is further configured to transfer the third portion and a fourth portion, of the second image data, to the second output controller, and the third portion and the fourth portion respectively represent a same second color component, for the first page and the second page, different than the same first color component.

* * * * *